April 28, 1964   S. G. GOODRICH ETAL   3,130,685
CONVEYOR SYSTEMS
Filed Dec. 12, 1961   10 Sheets—Sheet 1
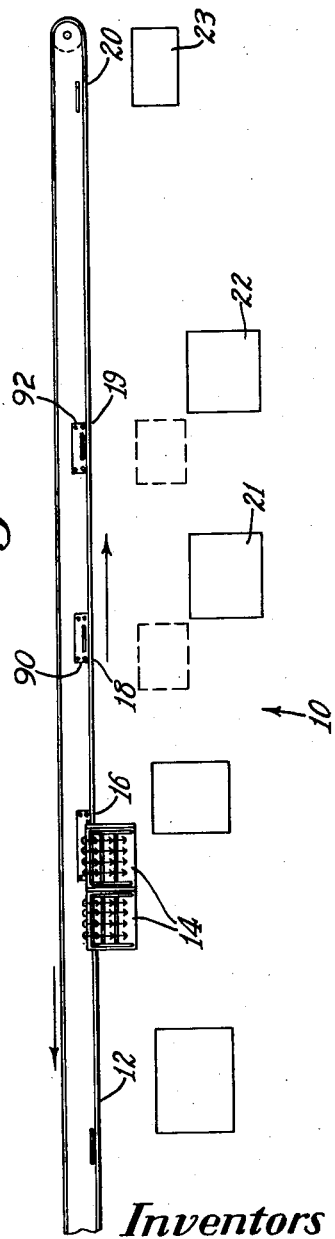
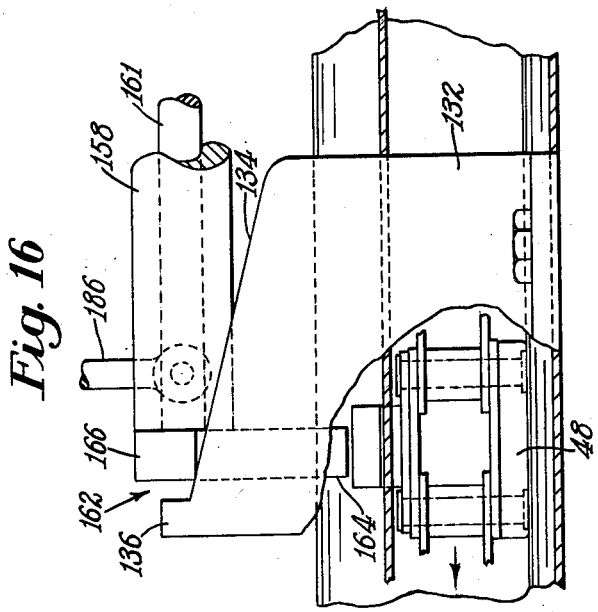
Inventors
Sidney G. Goodrich
Albert E. Lovett
Reginald T. Moore
Frank R. Smith
By their Attorney

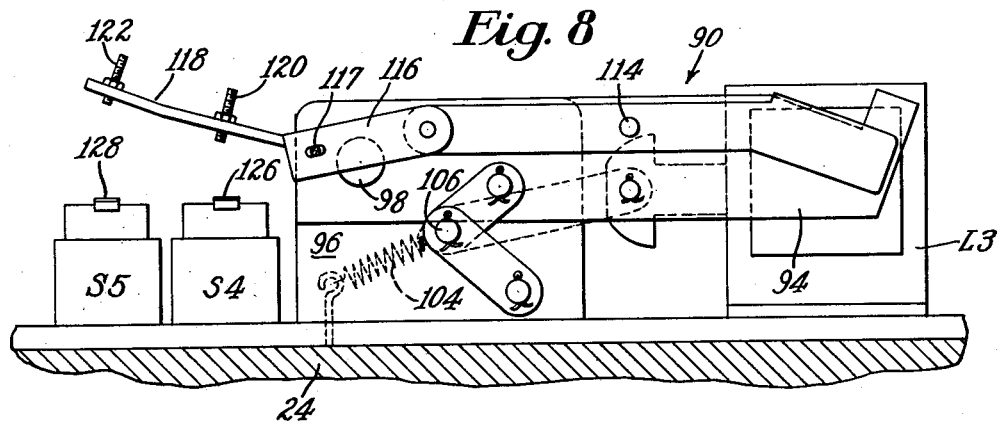
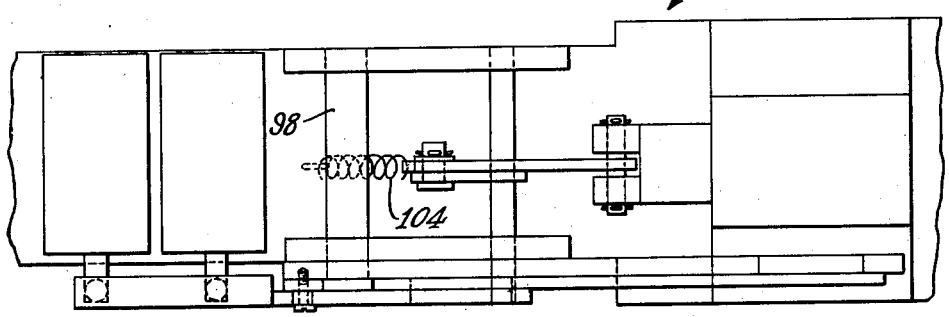
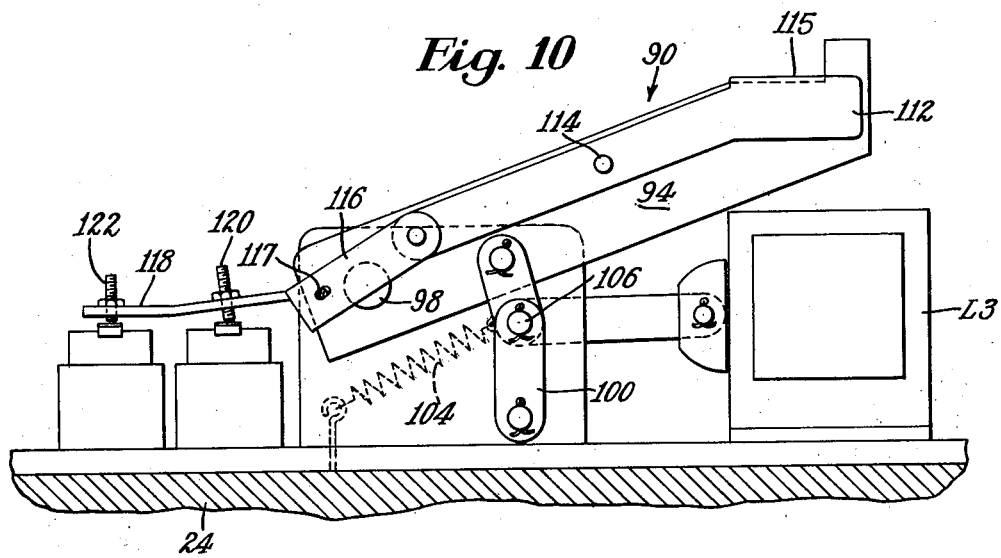

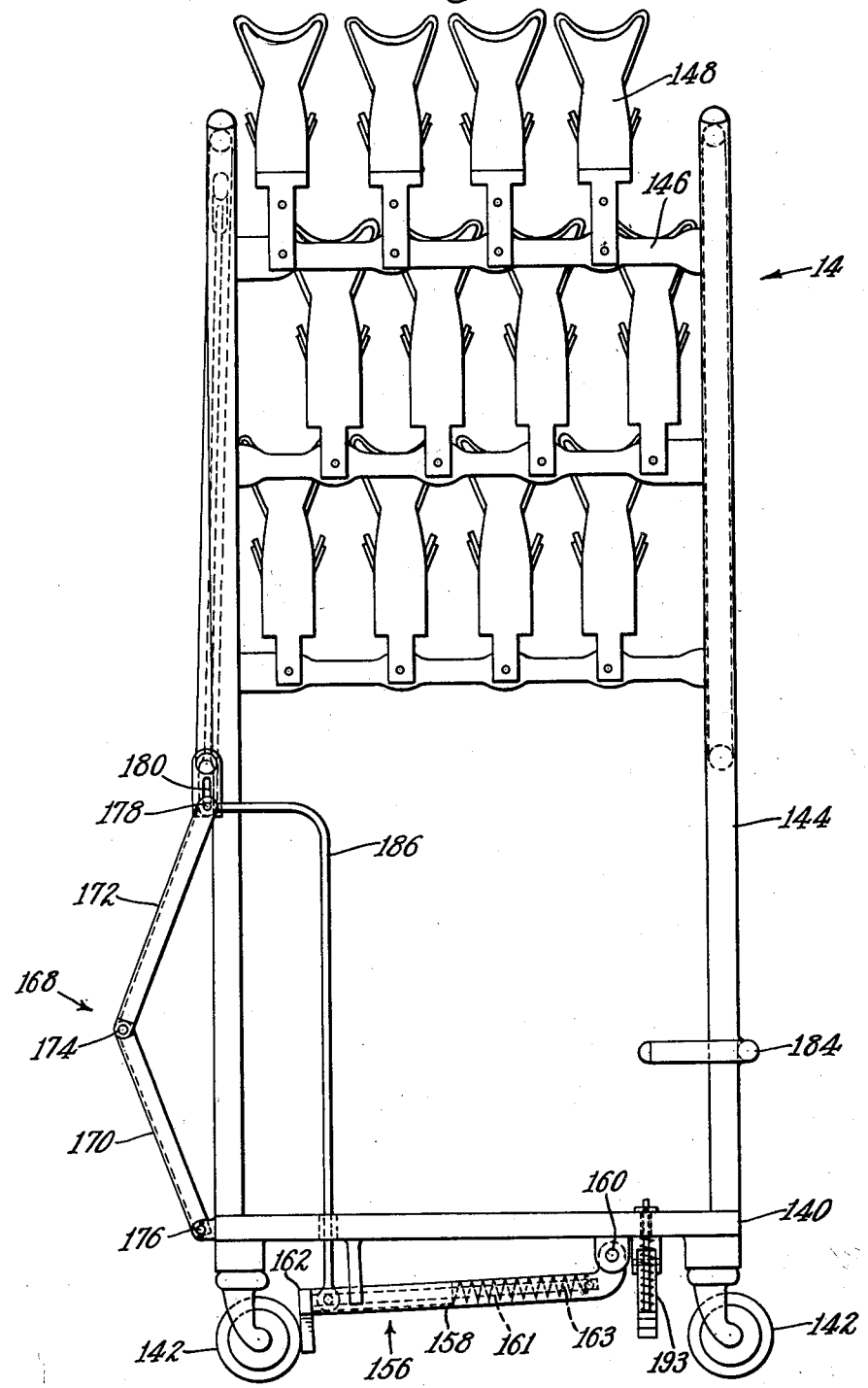

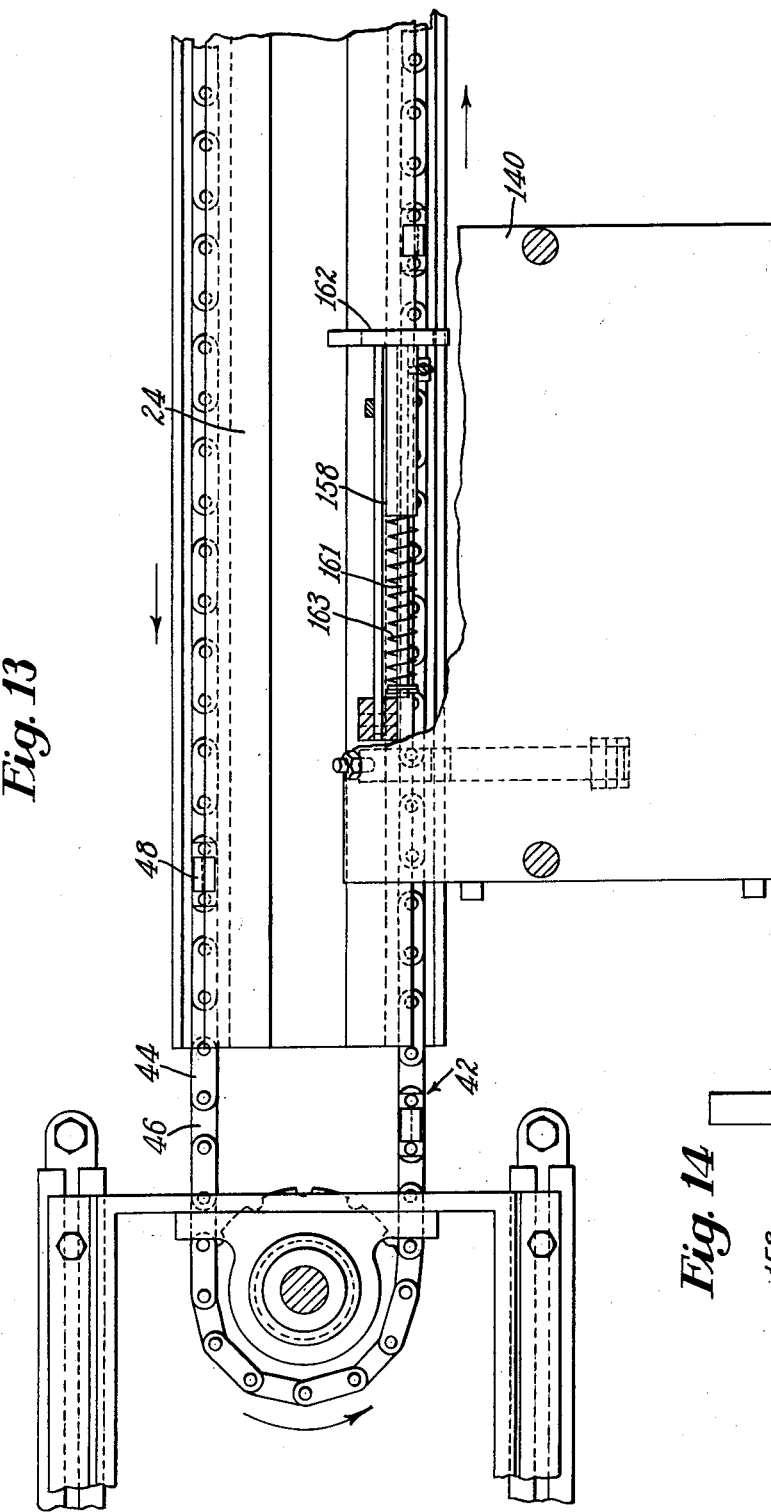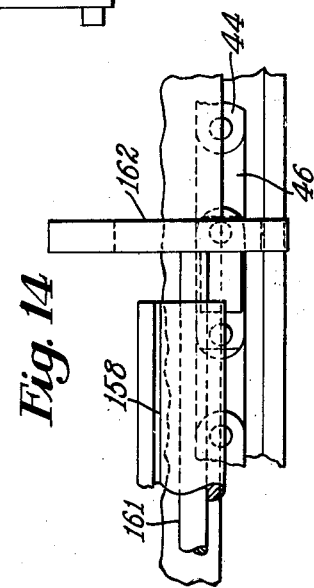

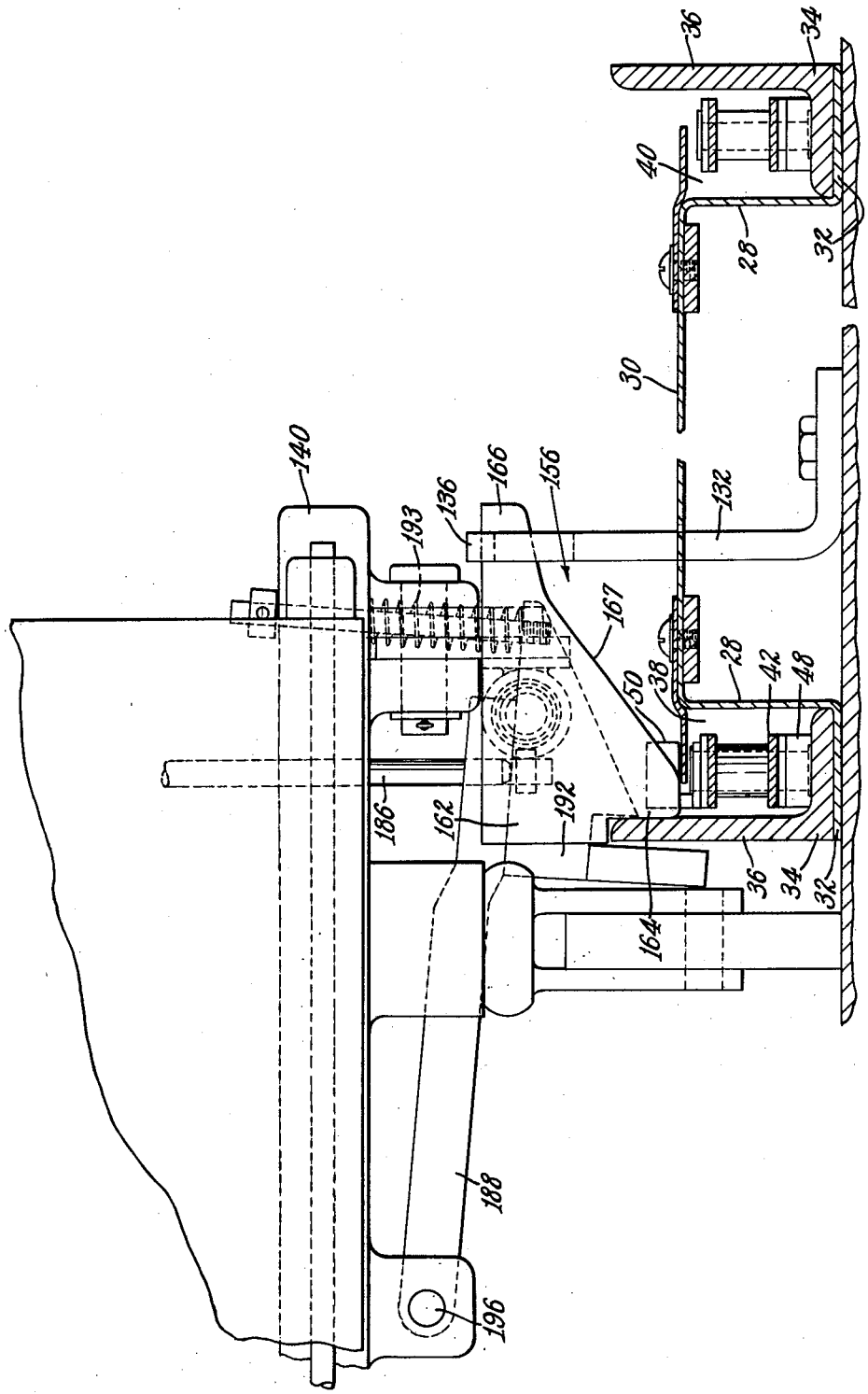

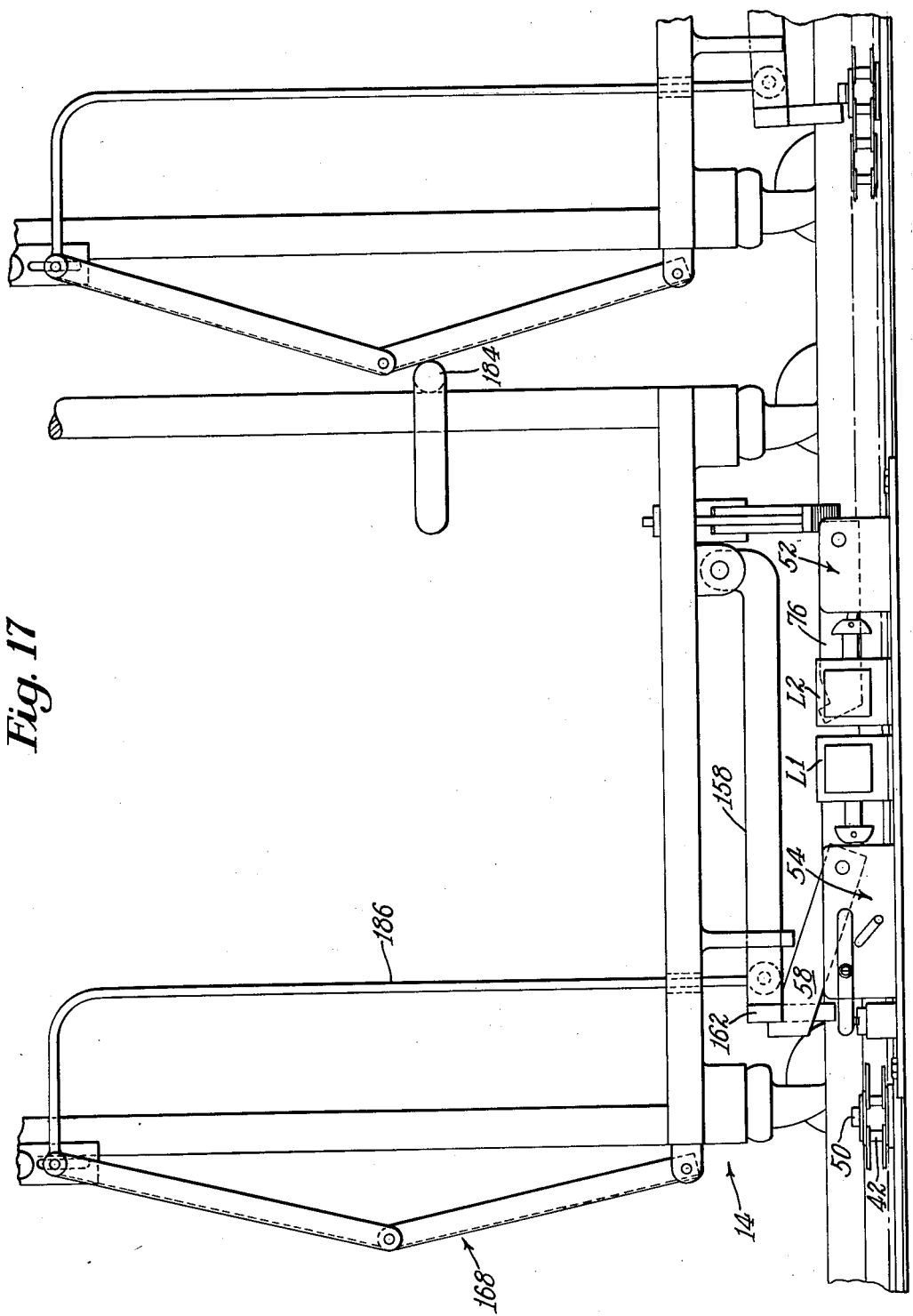

United States Patent Office 3,130,685
Patented Apr. 28, 1964

3,130,685
CONVEYOR SYSTEMS
Sidney Gordon Goodrich, Albert Edward Lovett, Reginald Thomas Moore, and Frank Richard Smith, all of Leicester, England, assignors to United Shoe Machinery Corporation, Flemington, N.J., a corporation of New Jersey
Filed Dec. 12, 1961, Ser. No. 158,682
Claims priority, application Great Britain Dec. 20, 1960
11 Claims. (Cl. 104—172)

This invention relates generally to conveyor systems, and has particular reference to a conveyor and an article storage rack for use therewith which is particularly adapted for use in the manufacture of footwear.

Shoes in the process of manufacture are usually carried on racks, which are pushed manually between machine stations at which various operations are performed. The transfer of the racks between stations is frequently the responsibility of the machine operators, and since the time consumed in accomplishing the transfer is appreciable, the operator's time available for production operations is reduced. During such transfer the racks are frequently misplaced, upset, or involved in collisions with other racks which often result in damage to the shoes carried thereon.

The object of this invention is to provide a conveyor system for the purpose which is adapted to convey automatically the racks between various machine stations.

A further object of the invention is to provide a rack assembly adapted for use with a conveyor of the type described.

A further object of the invention is to provide a rack conveyor system adapted to transfer racks from a pool position to an operating station in which means is provided under the control of the operator to release in sequence racks from the pool position and means is provided at the operating station for automatically stopping a released rack.

A further object of the invention is to provide a conveyor system in which the release of a rack to an operating station from a pool position causes a subsequent rack at the pool position to be moved into a position for release.

Other objects of the invention will be apparent to one skilled in the art from a following detailed description of a specific embodiment thereof.

FIG. 1 is a schematic plan view of a conveyor system embodying the features of the invention, illustrating the relation of the various components of a series of work stations;

FIG. 8 is a view of a work station stop member in the pass position;

FIG. 9 is a top plan view of the mechanism of FIG. 8;

FIG. 10 is a view of the mechanism of FIG. 8 in the stop position;

FIG. 11 is a view in side elevation of a rack adapted for use with the conveyor system of FIG. 1;

FIG. 13 is a top plan view of a portion of the conveyor, and a rack shown in operative relation thereto, with a portion of the rack being partly broken away for clarity in illustrating the conveyor engaging mechanism;

FIG. 14 is an enlarged view in top plan of the conveyor engaging portions of the rack disposed in operative relation to the conveyor, with certain parts omitted for clarity;

FIG. 15 is an enlarged view in front elevation of the conveyor engaging portion of the rack disposed in operative relation to the conveyor;

FIG. 16 is a view of the mechanism of FIG. 15 as seen from the right side;

FIG. 17 is a view in side elevation of a pair of racks disposed at the pool stop position.

Figure 2:
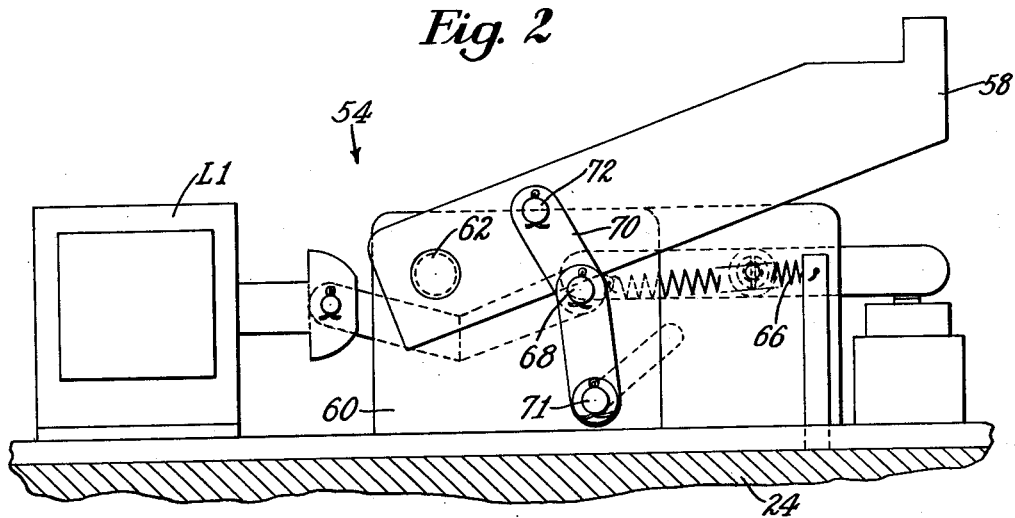
FIG. 2 is a view in side elevation of the downstream pool stop mechanism in the stop position.
Figure 3:
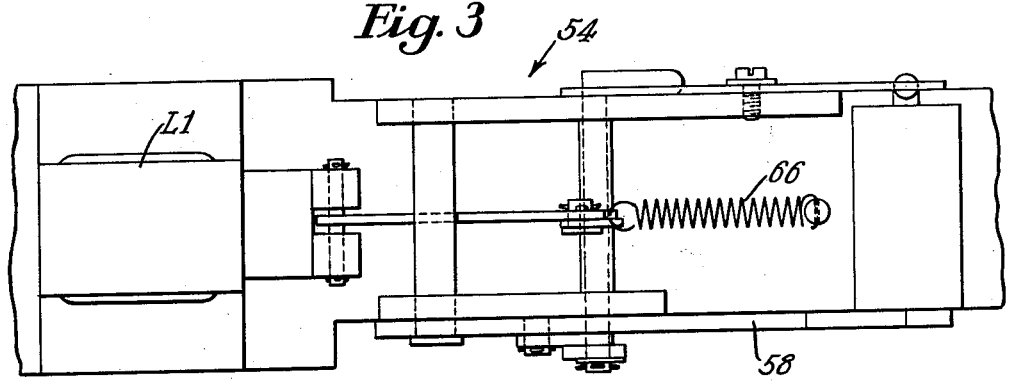
FIG. 3 is a top plan view of the mechanism of FIG. 2.

Referring to the drawing there is illustrated a conveyor system 10 comprising a chain conveyor 12 and a series of racks 14 adapted to be transferred by the conveyor from a pool position 16 to various stop positions 18, 19 and 20 associated with work stations 21, 22, and 23. In the illustrated embodiment the racks 14 are adapted to receive partially fabricated shoes on which predetermined operations are to be performed at the work stations. As will be described hereinafter, the racks are adapted to be moved manually into operative relation to the conveyor at a position upstream from the pool position and transported by the conveyor on a predetermined signal to a desired stop station, automatically disengaged from the conveyor, and manually removed from operative relationship to the conveyor. Although many variations in the conveyor stop position arrangement and work station arrangements are possible, in the particular embodiment illustrated the work stations are so arranged to accommodate efficiently operations which require different times for completion. For example the operation to be performed at work station 23 may require only half the time necessary for the operation to be performed at station 21, hence station 22 may be provided with means for performing the same operation as station 21 so that each rack will be required to stop at either stop position 18 or stop position 19, but not at both, whereas all racks will be required to stop at stop position 20.

The conveyor 12 comprises a base 24 extending through the pool station 16 and the stop positions 18–20, consisting of a channel member comprising spaced vertical side walls 28 joined by a horizontal top portion 30 and having laterally extending floor flanges 32. Mounted on each floor flange 32 is an angle member 34 having an upstanding flange 36 spaced from the adjacent side wall 28 and forming channels 38 and 40. Disposed in the channels 38 and 40 is an endless conveyor chain 42 which is driven continuously at a uniform speed by any suitable means so that the chain portions in the channels travel in the directions indicated by the arrows (see FIGS. 1 and 13). The chain 42 comprises links 44, joined by connecting members 46, with each link 44 having a support block 48 disposed in the lower side and an upwardly extending pawl 50 for cooperation with a latch mechanism in the racks 14 in a manner to appear hereinafter.

*The Stop Devices*

To control the movement of the racks by the conveyor, stop devices are disposed in operative relation to the conveyor at the pool position and at each work station.

At the pool station 16, a double stop device 52 is disposed in the channel member and is adapted to release a single rack from the pool position in receipt of an electrical signal and subsequently permit a following rack to move into position for release on receipt of a subsequent signal. For this purpose the pool stop device 52 comprises a pair of stop mechanisms 54 and 56.

Figure 4:
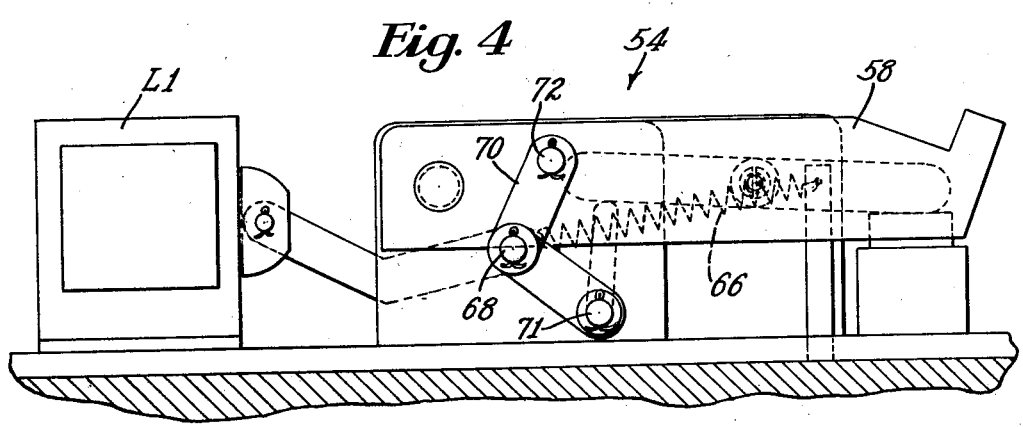
FIG. 4 is a view of the mechanism of FIG. 2 in the pass position.

The downstream mechanism 54 comprises latching arm 58 pivoted to a support bracket 60 by pin 62 at the upstream end thereof and is pivotally movable about said pin between a stop position in which the arm is inclined upwardly and a pass position in which the arm extends in a generally horizontal direction. The arm 58 is moved between the horizontal pass position (see FIG. 4) and the upwardly inclined stop position (see FIG. 2) by means of a solenoid L1 and a spring 66 which are connected by suitable linkage to the knee 68 of a toggle 70. One end 71 of the toggle is secured to the bracket 60 and the other end 72 is secured to the arm 58. With the solenoid deenergized the spring 66 maintains the toggle 70 in the position shown in FIG. 2 so that the arm 58 is held in the upwardly inclined stop position. When the solenoid L1 is energized the toggle knee is moved to the left, causing the arm 58 to pivot clockwise to the pass position.

When the arm 58 is in the upwardly inclined or stop position, it is adapted to engage a latch mechanism in a rack 14, to cause the latch mechanism to become disengaged from the conveyor chain and stop the rack, in a manner to appear hereinafter. To prevent the inertia of the rack from carrying it past the station after such disengagement, the outer end of the arm 58 is provided with an abutment to receive a cooperating portion of the rack latch member.

Figure 5:
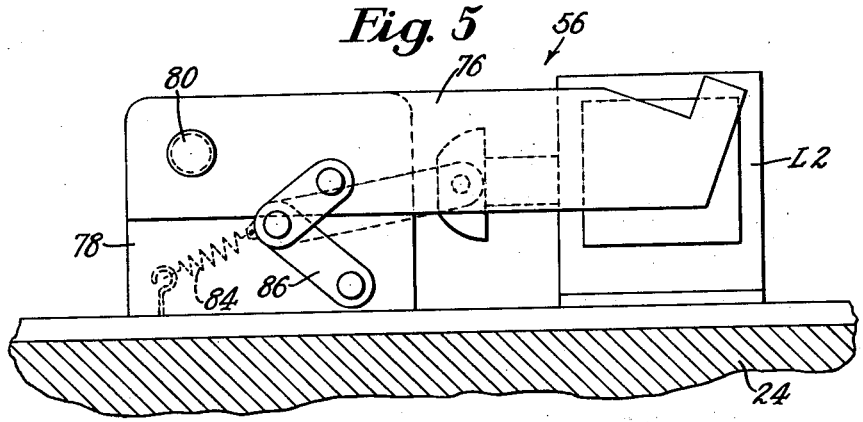
FIG. 5 is a view in side elevation of the upstream pool stop mechanism in the pass position.
Figure 6:
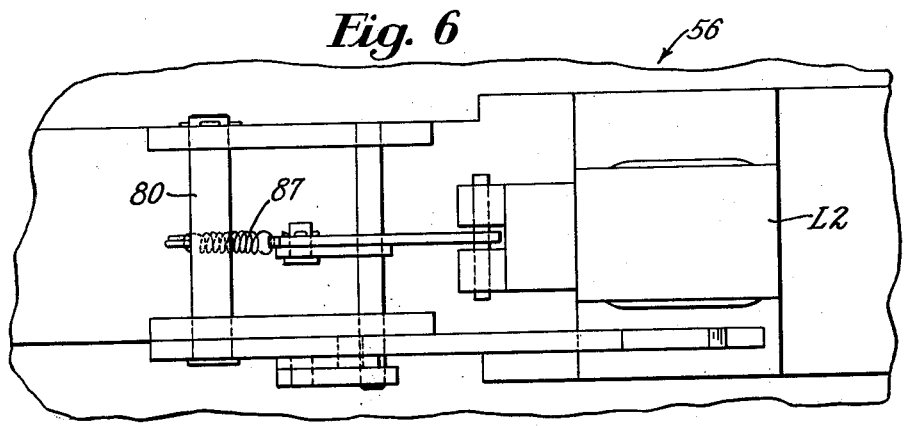
FIG. 6 is a top plan view of the mechanism of FIG. 5.
Figure 7:
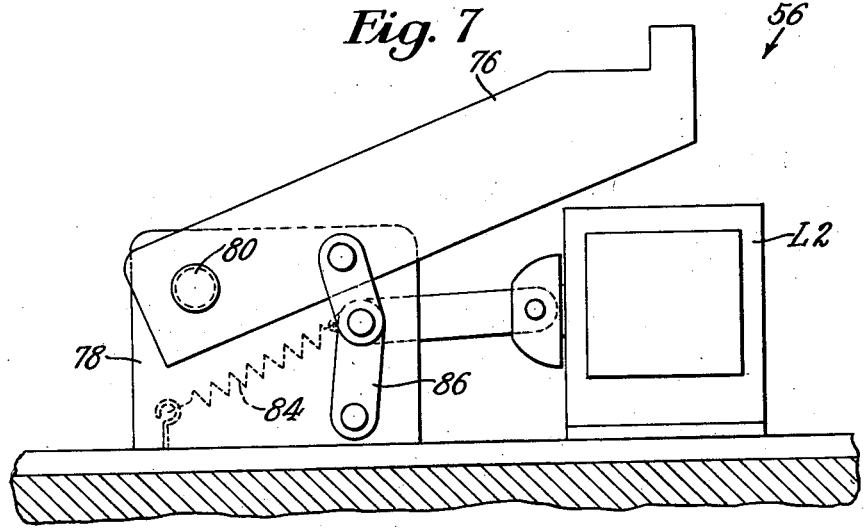
FIG. 7 is a view of the mechanism of FIG. 5 in the stop position.

The upstream stop mechanism 56 is generally similar to the downstream mechanism 54 and comprises a latching arm 76 pivoted to a support bracket 78 at a pin 80, a solenoid L2 and a spring 84 controlling the movement of a toggle 86, which controls the position of the arm 76 in the manner previously described. The solenoid L2 and the spring 84 are so arranged that when the solenoid is deenergized the action of the spring 84 on toggle 86 moves the arm to the horizontal or pass position (see FIG. 5). On energization of the solenoid, the toggle 86 is straightened so that the arm 76 moves to the upwardly inclined stop position (see FIG. 7). As will appear hereinafter, the solenoids L1 and L2 are connected in parallel so that they are energized or both deenergized at the same time. When the solenoids are deenergized, the downstream arm is in the upwardly inclined stop position and the upstream arm is in the horizontal pass position which condition may be considered to be the hold condition of the pool position stop device. When the solenoids L1 and L2 are energized, the downstream arm 58 moves to the pass position and the upstream arm 76 moves to the stop position, which may be considered to be the release condition of the pool position stop device.

The work stations 18 and 20 are each provided with identical stop devices 90 and 92, which are adapted to stop a rack on receipt of the proper electrical signal. Each stop device 90 and 92 also has associated mechanism to create a holding circuit to maintain itself in the stop position as long as the rack is in engagement therewith and also has means to reset itself to the pass position on removal of a stopped rack from operative relationship therewith.

The stop device 90 comprises a latching arm 94 pivoted to a support bracket 96 at pivot pin 98 and an operating toggle 100 pivoted to the bracket and to the arm. The position of toggle 100 is controlled by a solenoid L3 and a spring 104 connected to the knee 106 thereof, so arranged that when the solenoid is not energized, the toggle is broken by the spring 104, lowering the latching arm 94 to the pass position, whereas when the solenoid is energized, the toggle is straightened, raising the latching arm 94 to the stop position.

To provide means for causing the stop device 90, which has stopped the rack, to return to the pass position when the rack is removed from operative relationship therewith, the stop devices 90 and 92 are each provided with a switch control arm 112 which is pivoted at a medial portion to the latching arm 94 at a pin 114. The forward end of the switch control arm 112 has a portion 115 which normally extends slightly above the upper surface of the latching arm 94. A switch operating lever 116, medially pivoted to pin 117, is hinged at its forward end to the rear end of the control arm 112 and is provided with an extension 118, carrying a pair of adjustable set screws 120 and 122 disposed above operating plungers 126 and 128 of micro-switches S4 and S5. When the stop device is in either the pass or hold position, the plungers are not normally depressed. However, on arrival of a rack at the stop position, the outer end of the control arm 112 is depressed by means on the rack in a manner to appear hereinafter causing the rear end of the control arm to move upwardly, pivoting the extension 118 downwardly to depress the plungers 126 and 128 to actuate switches S4 and S5 for a purpose to appear hereinafter.

In the illustrated embodiment of the invention the final stop position 20 is disposed at the downstream end of the conveyor, at which position is disposed a stop member 132 comprising an upright plate having an inclined upper surface terminating in an abutment 136. The stop member 132 is adapted to stop all racks reaching the final stop position 20, from which positions they may be removed from the conveyor to be manually transferred for subsequent operations on the shoes carried by the racks.

A rack 14 adapted for use with the conveyor system comprises a base 140 having casters 142 mounted thereon. Extending upwardly from the base is a tubular frame 144 having cross members 146 extending therebetween on which are mounted individual shoe retainers 148. To facilitate manual movement of the racks into and out of operative relationship with the conveyor, forwardly extending handle members 150 are secured to the frame 144 at each end of the rack, each member 150 having a vertical portion 152 and a lower horizontal portion 154 joined to the frame.

To provide means for engagement of the conveyor chain 12 with the rack when the rack is in operative relationship to the conveyor, and to provide means to be actuated by the previously described stop devices to move a conveyor engaging means into and out of engagement with the conveyor, a latch mechanism 156 is disposed on the rear side of the rack below the base 140. The latch 156 comprises a hollow support arm 158 joined to the base at pivot 160 and extending toward the other end of the rack. Assembled within the arm 158 is a rod 161 having a latch plate 162 disposed on the end thereof. In the illustrated embodiment the rod 161 is resiliently mounted in the arm by means of a spring 163 extending between the innermost portion of the rod and the outer end of the arm, so that the rod and latch plate are normally biased into the arm, but may be extended therefrom against the force of the spring when the latch plate engages the conveyor chain, as will be described hereinafter. When the rack is placed in operative relation to the conveyor, the latch plate 162 is disposed above the conveyor chain, in position for engagement with the pawls 50 of the chain. The latch plate is also positioned for actuation by the various stop members previously described. To this end the latch plate 162 is provided with a downwardly projecting portion 164 for engagement with a pawl 50 when the latch plate is in the lowered position, a laterally extending portion 166 (FIG. 15) adapted for engagement with the stop members in a manner to appear hereinafter, and an inclined camming portion 167 extending therebetween.

To provide means for automatically disengaging the latch plate 162 from the conveyor chain when a rack being conveyed collides with another rack stopped at the pool position or at a downstream stop position, the forward end of each rack is provided with a bumper 168 (FIG. 11) comprising a pair of forwardly inclined plates 170 and 172 hinged at 174. The lower plate 170 is connected to the rack base 140 at pivot 176, and the upper plate has a transverse rod 178 slidably disposed in slots 180 in guide members 182 mounted on the lower horizontal portion 154 of the handle. To cooperate with the bumper of a following rack, each rack is provided with a bumper bar 184 on the rear end thereof, positioned to be contacted by the forward bumper of said following rack. As a result of such contact, the bumper plates 170 and 172 are forced toward the rack, so that the upper end of the upper plate 172 moves upwardly. Such movement effects disengagement of the latching plate from the conveyor chain by means of control rod 186, which is joined at the upper end to the transverse rod 178 at the upper end of the plate 172, and joined at the lower end to the arm 158 carrying the latching plate.

Figure 12:
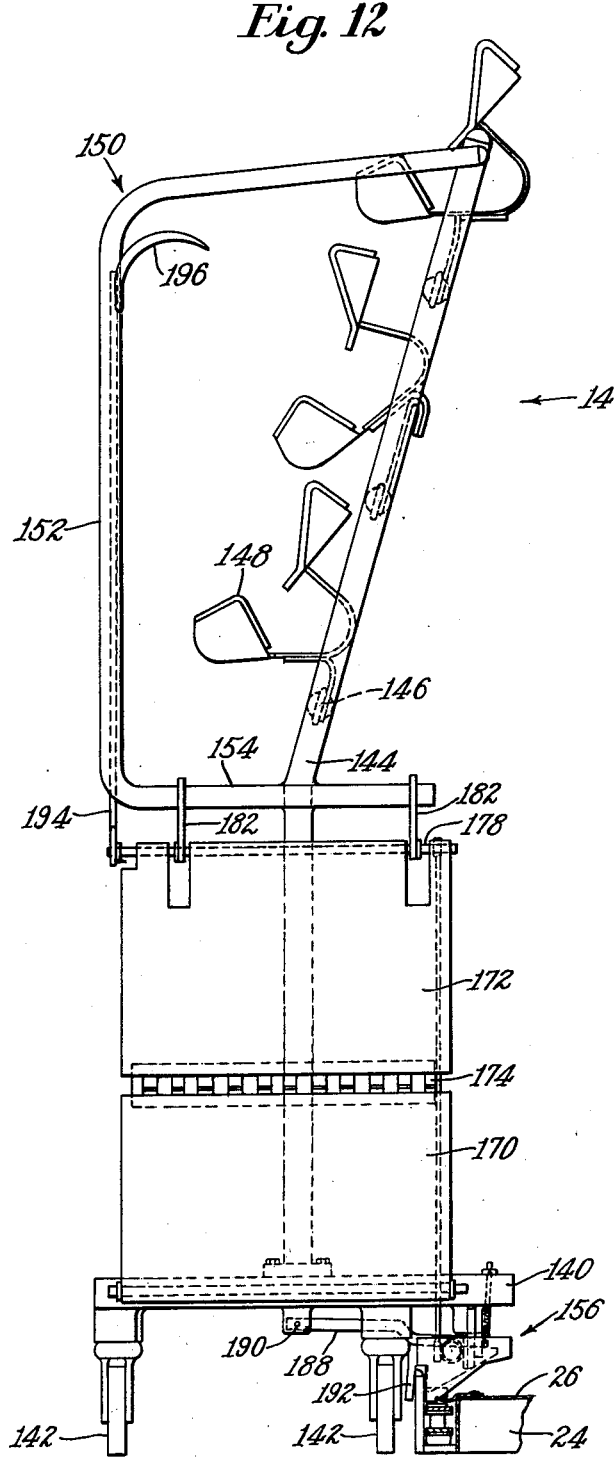
FIG. 12 is a view of the rack of FIG. 11 as seen from the left, or front end, disposed in operative relation to the conveyor.

To provide manual means for disengaging the latch plate from the conveyor, a rod 194 (FIG. 12) extends upwardly from the upper end of the upper bumper plate 172, with a hand grip 196 disposed in the upper end thereof, said rod 194 and said hand grip 196 being slidably mounted on said vertical portion 152 of the handle 150.

To maintain the rack in alinement with the conveyor as it is being moved between stop positions, a rear guide arm 188 is mounted on the lower side of the base at pivot 190, said arm extending generally toward the rear side of the rack and having a guide member 192 disposed on the end thereof adapted to ride on the flange 36 of the adjacent angle member 34. The guide member 192 is biased downwardly against the flange by spring loading mechanism 193 (FIG. 11).

A rack 14 may be moved into operative relationship to the conveyor by pushing the rack sideways into the conveyor, whereby the camming portion 167 of the latch plate 162 rides over the flange 36 of the adjacent angle member 34 and the downwardly projecting portion 164 of the latch plate moves into position for engagement by a pawl 50 on the conveyor chain, whereby the rack is moved by the conveyor until it encounters a stopped rack, or until the latch plate is raised out of engagement with the conveyor by the action of a stop device on the laterally extending portion 166.

When a first rack is placed in operative relation to the conveyor, it will normally be disposed upstream from the pool position, and will be moved by the conveyor to the pool station. Assuming that there is no rack already stopped at the pool position, and the pool stop is in its normal stop position as previously described, with the latching arm 58 of the downstream stop mechanism in the upwardly inclined stop position, and the latching arm 76 of the upstream stop mechanism in the horizontal or pass position, when the first rack arrives at the pool station, the laterally extending portion 166 of the latch plate will ride up the latching arm 58, thereby causing the latch plate to become disengaged from the conveyor chain and stopping the rack.

When a second rack is placed in operative relation to the conveyor upstream from the pool position, it will be moved toward the pool position by the conveyor until the front bumper of the second rack collides with the rear bumper bar of the first rack already stopped at the pool position, and the latch plate 162 of the second rack will become disengaged from the conveyor in the manner previously described.

When the positions of the stop mechanism 54 and 56 are reversed by energization of solenoids L1 and L2, by means to appear hereinafter, the latch mechanism of the first rack at the pool stop position is permitted to reengage the conveyor and the rack is moved thereby away from the pool position.

The release of the bumper mechanism on the second rack then permits the latch plate thereof to reengage the conveyor chain, and said second rack (and any following rack) is moved by the conveyor until the latch mechanism thereof is disengaged from the chain by the upstream stop mechanism 56, which is in the stop position. When the positions of the pool stop mechanisms are subsequently reversed by deenergization of solenoids L1 and L2 by means to appear hereinafter, the second rack is moved a short distance by the conveyor chain until it is stopped by the downstream pool position stop mechanism 54.

The first rack, after being released from the pool position, is moved by the conveyor until it is stopped by one of the stop mechanisms at the desired work station, which mechanism is actuated in a manner to appear hereinafter.

Figure 18:
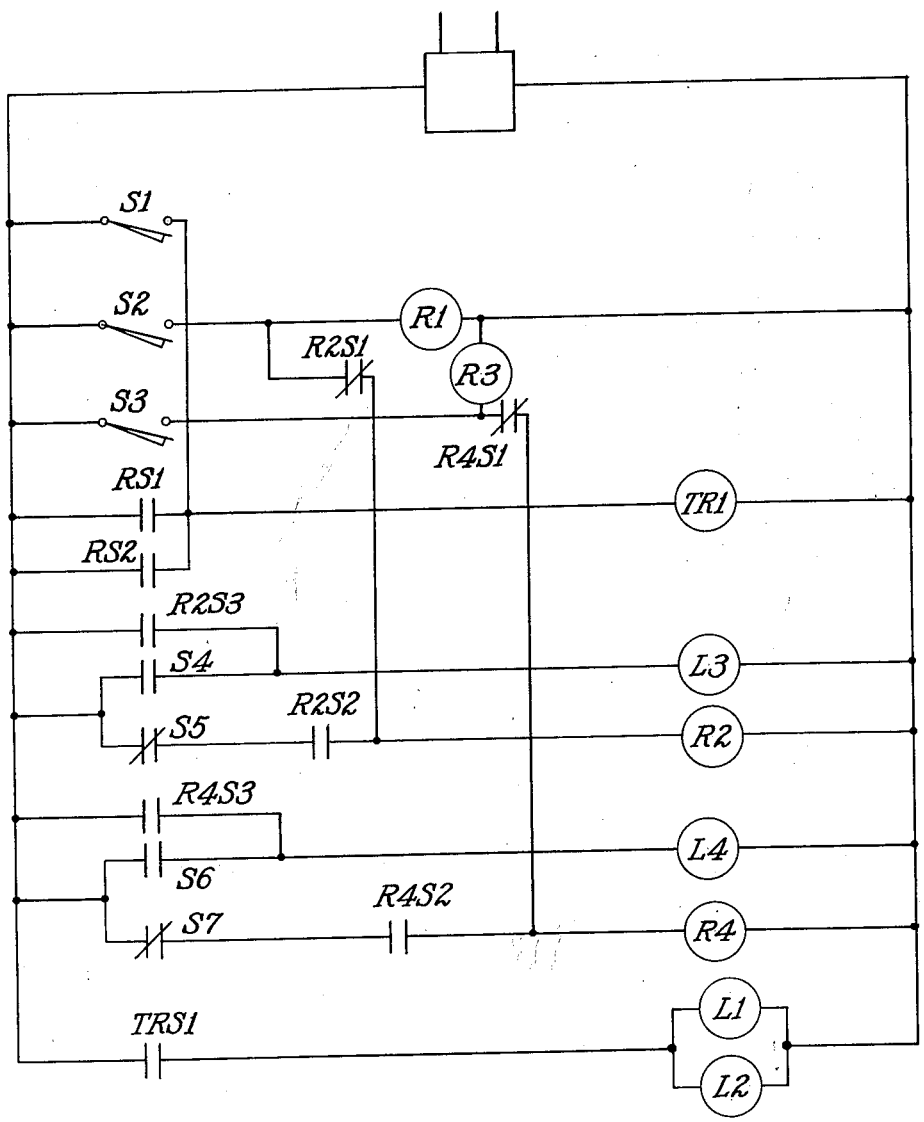
FIG. 18 is a schematic diagram of the electrical circuit of the conveyor.

The operation of the conveyor is controlled, in a manner now to be described, by manual switches S1, S2 and S3 disposed at the pool position 16, stop position 18 and 19 respectively, and by the previously described mechanically actuated switches S4 and S5 associated with the stop device 90 and switches S6 and S7 associated with the stop device 92, in conjunction with certain relays and other components connected thereto in the manner illustrated in FIG. 18.

Assuming that the conveyor is running and a supply of racks is disposed at the pool position the electrical circuit is in the condition shown in FIG. 18. If a rack is desired to be released from the pool position and pass to the final stop position 20 without stopping at intervening positions 18 or 19, switch S1 at the pool position may be momentarily depressed, which energizes timing relay TR1 closing switch TRS1, thereby energizing solenoids L1 and L2 thereby reversing the positions of the stop mechanisms 54 and 56 and permitting the latch of the first rack to become engaged with the conveyor in the manner previously described while the second rack is retained by the upstream stop device 56. After a predetermined time, sufficient to permit the first rack to clear the pool stop devices, switch TRS1 is again opened by timing relay TR1 whereby the stop devices return to their original position, and the second rack moves forwardly into the release position where it is stopped by the downstream rod stop device 54. The first rack is moved by the conveyor to the final stop member, without stopping at intervening positions 18 and 19 since the latch arms thereof are in the pass position. On arrival at the final position 20, the rack latch is disengaged from the conveyor by the stop member 132, and the rack may be thereafter manually removed from operative relationship with the conveyor.

If the operator at work station 21 desires a rack from the pool position, he closes switch S2 which (1) Energizes relay R1, closing relay switch RS1, thereby energizing timing relay TR1, which closes timing relay switch TRS1 which energizes the pool position solenoids L1 and L2, releasing a rack as previously described;

(2) Energizes relay R2 through normally closed relay switch R2S1 which (a) Closes relay switch R2S2 which creates a holding circuit to the relay coil through switch S5, (b) Closes relay switch R2S3 which energizes solenoid L3, thereby raising the latching arm 94 to the stop position, so that it is prepared to arrest the rack released from the pool position.

When the released rack arrives at stop position 18, the latch plate 162 rides up the arm 94, disengaging the rack from the conveyor chain, and thereby actuates, by the control arm 112 and the operating lever 106, the switches S4 and S5. The set screws 122 and 124 are so adjusted that switch S4, which is normally open, is closed a moment before normally closed switch S5 is opened.

When switch S4 is closed by the arrival of the rack, a second or holding circuit is completed to solenoid L3 and momentarily thereafter, the switch S5 is opened, which breaks the holding circuit to relay R2, so that all switches of relay R2 return to their original positions. Hence the stop device 90 is maintained in the stop position only by the presence of the rack at the stop position.

When the rack is thereafter manually removed from the conveyor, switch S4 is opened breaking the holding circuit to solenoid L3, permitting the stop device to return to the pass position.

When the operator at station 21 is finished with a rack, he places it into operative relation to the conveyor on the downstream side of his stop mechanism 90, whereby it is conveyed to the final stop position 20 and arrested by the fixed stop member 132.

When the operator at station 22 desires a rack from the pool position he closes switch S3 which actuates the pool position stop mechanism to release a rack, and sets the stop device 92 at the stop position 19 through the appropriate circuit elements shown in FIG. 18, in a manner similar to that previously described.

Although electrical interlock means may be provided to prevent an operator at one station from releasing a rack from the pool positions while another rack is being conveyed, such arrangements have been found to be unnecessary, since the movement of the racks is visible to all operators and an operator at a station need only wait until the conveyor is clear before releasing a rack from the pool position.

The location and number of the stop positions may be varied to accommodate different work procedures. For example, a second pool position may be located downstream from the permanent stop position to feed further work stations.

Although in the illustrated embodiment, the system is particularly adapted for the manufacture of shoes, it is readily adapted to any other type of manufacturing procedure in which operations are accomplished on an article in a predetermined sequence at different work stations.

Since certain other changes may be made in the device without departing from the scope of the invention, it is intended that all matter contained herein be interpreted in an illustrative and not in a limiting sense.

Having thus described our invention, what we claim as new and desire to secure by Letters Patent of the United States is:

1. A conveyor system for conveying article-carrying devices between work stations, comprising conveying means extending from a pool position past said work stations, means associated with said work stations for arresting an article-carrying device released from the pool position, means associated with each work station for releasing an article-carrying device from the pool position and for actuating a first means for energizing said arresting means, and means responsive to the arrival of the released device at the arresting means to actuate a second means for energizing said arresting means and deactuate said first means.

2. A conveyor system, comprising a conveyor chain extending past various stop stations at which article-carrying devices conveyed by the chain may be stopped, first stop means, means for releasing said devices one at a time from said first stop means, a final stop means adapted to arrest all devices conveyed thereto, and an intervening stop means movable between a pass position in which a device being conveyed is not arrested and a stop position in which a device being conveyed is arrested, means moving said intervening stop means to the stop position when a device is released from the first stop means, and means responsive to the removal of an arrested device from the intervening stop means to cause said intervening stop means to return to the pass position.

3. A stop mechanism adapted for use in a conveyor system of the type described, comprising an arresting arm, solenoid means adapted on energization of a first circuit to move said arresting arm to a stop position, control means associated with said arresting arm adapted to be engaged by an article-carrying device arrested by the arm, means responsive to said engagement for breaking said first solenoid energizing circuit and creating a second solenoid energizing circuit which is maintained only by said engagement.

4. A pool stop mechanism for use in a rack conveyor system of the type described and adapted to release racks one at a time from a series of racks retained by said mechanism, comprising a pair of arresting devices spaced longitudinally in relation to the conveyor means, each device comprising an arresting arm movable between a substantially horizontal position and an upwardly inclined position where it is adapted to engage a rack, latch means to disconnect the rack from the conveyor, the downstream arm being normally in the upwardly inclined position, the upstream arm being normally in the horizontal position, and means for substantially simultaneously reversing the position of each arm.

5. A conveyor system for conveying article-carrying devices between work stations, comprising conveying means extending from a pool position past said work stations, means associated with said work stations for arresting an article-carrying device released from the pool position, means associated with each work station for releasing an article-carrying device from the pool position and for moving an arresting means at the work station into an arresting position, first means for maintaining said arresting means in an arresting position, means responsive to the arrival of an article-carrying device at the work station for actuating second means for maintaining said arresting means in an arresting position and for releasing said first means, said second means being automatically releasable upon removal of the device from operative relation to the conveying means.

6. A conveyor system, comprising driving means adapted to travel from a pool position past various work stations at which article-carrying devices conveyed thereby may be stopped, pool position stop means, means for releasing said devices one at a time from the pool position stop means, and work-station stop means movable between a pass position in which a device being conveyed is not arrested and a stop position in which a device being conveyed is arrested, means at each work station for moving the pool position stop means to the pass position and the associated work-station stop means to the stop position, and means responsive to the removal of an arrested device from the work-station stop means to cause said work-station stop means to return to the pass position.

7. A stop mechanism adapted for use in a conveyor system of the type described, comprising stop means movable between a pass position and a stop position, first means for maintaining said stop means in a stop position, means responsive to the arrival of an article carrying device at the stop mechanism for actuating second means for maintaining said stop means in a stop position and for releasing said first means.

8. A conveyor arrangement, comprising driving means for extending along a floor, a guide rail extending alongside said driving means and an independent article-carrying device adapted to travel alongside the driving means by engagement therewith, said article-carrying device having supporting casters and latch means disposed on one side to the exterior of the casters, said latch means having a portion adapted to be cammed over the guide rail into position for engagement with the driving means when the device is moved toward the guide rail in a direction generally perpendicular thereto.

9. A rack conveyor system, comprising driving means extending along a floor, a guide rail extending along one side of the driving means, and rack stop members disposed alongside the other side, and a rack adapted for use therewith, said rack having latch means on one side thereof permitting engagement with the guide rail by sideways movement of the rack toward the guide rail, said latch means having a depending portion for engagement by the drive means and a portion adapted to project beyond the drive means for engagement by said stop members on the other side thereof.

10. A rack adapted for use with a conveyor having driving means of the type described, comprising a base having caster means permitting free movement of the rack in any direction, and a driving means engaging latch disposed on one side of the rack outside of the casters, said latch having camming means adapted for engagement with the driving means by movement of the rack into operative relation to the driving means in a direction generally perpendicular to the direction of movement of said driving means.

11. A rack adapted for use with a conveyor having driving means of the type described and a guide rail disposed alongside the driving means, said rack comprising a base having caster means permitting free movement of the rack in any direction, and a driving means engaging latch disposed on one side of the base outside of the casters, said latch having a drive means engaging portion and an associated camming portion permitting said drive means engaging portion to be cammed over the guide rail into position for engagement by the drive means by movement of the rack sideways toward the guide rail, said latch also having a disengaging portion extending beyond the drive means engaging portion into position for cooperation with a stop mechanism disposed on the side of the drive means opposite the guide rail.

References Cited in the file of this patent

UNITED STATES PATENTS

| | | |
|---|---|---|
| 1,144,374 | Nolan | June 29, 1915 |
| 1,437,536 | Mason | Dec. 5, 1922 |
| 1,720,785 | Edler | July 16, 1929 |
| 2,572,011 | Cohen et al. | Oct. 23, 1951 |
| 2,619,370 | Leger | Nov. 25, 1952 |
| 2,619,916 | Rainier | Dec. 2, 1952 |
| 2,885,969 | Kay et al | May 12, 1959 |
| 2,950,688 | King | Aug. 30, 1960 |
| 3,027,850 | Burrows | Apr. 3, 1962 |

FOREIGN PATENTS

| | | |
|---|---|---|
| 1,202,902 | France | July 27, 1959 |
| 819,343 | Great Britain | Sept. 2, 1959 |